United States Patent [19]
Abraham

[11] 3,805,728
[45] Apr. 23, 1974

[54] POWER-RELEASED CHAIN STOPPER
[75] Inventor: James G. Abraham, Palos Verdes Peninsula, Calif.
[73] Assignee: Armco Steel Corporation, Middletown, Ohio
[22] Filed: July 16, 1973
[21] Appl. No.: 379,232

[52] U.S. Cl. .............................. 114/200, 114/210
[51] Int. Cl. ............................................. B63b 21/18
[58] Field of Search .................. 114/200, 199, 210; 254/175; 294/84

[56] References Cited
UNITED STATES PATENTS
157,736  12/1874  Coffin .............................. 114/200
311,573  2/1885  Emery ............................... 114/200
1,226,731  5/1917  Wheeler ............................. 114/200
3,536,024  10/1970  Bugaenko et al. ................... 114/200
3,547,066  12/1970  Bugaenko et al. ................... 114/200

Primary Examiner—Duane A. Reger
Assistant Examiner—Galen L. Barefoot
Attorney, Agent, or Firm—Roylance, Abrams, Berdo & Kaul

[57] ABSTRACT

A chain stopper, particularly for use with the anchor chains of offshore drilling vessels and the like, characterized by a power operated mechanism by which the pawl of the chain stopper is disengaged from the chain by a toggle action in order to achieve a quick release of the chain under emergency conditions.

12 Claims, 12 Drawing Figures

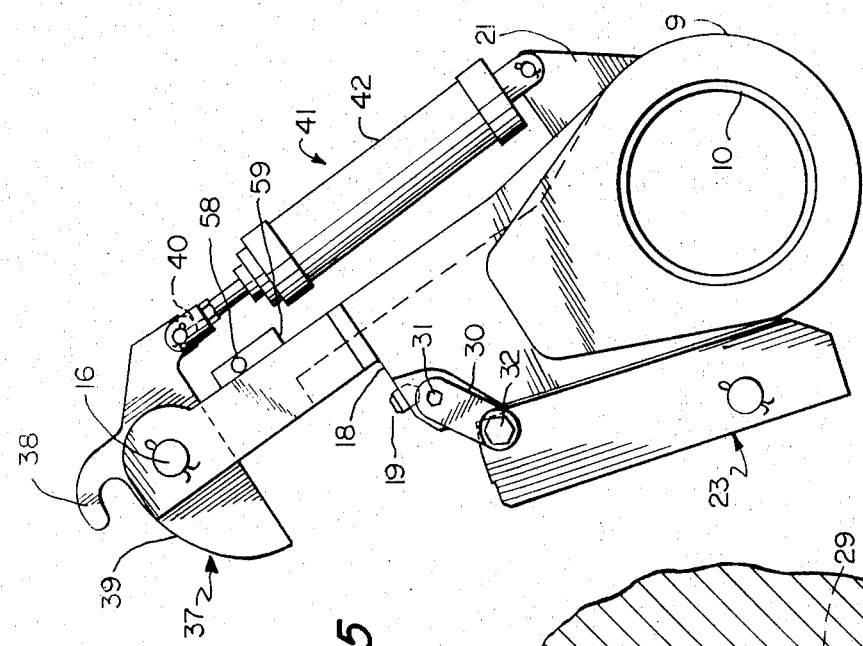
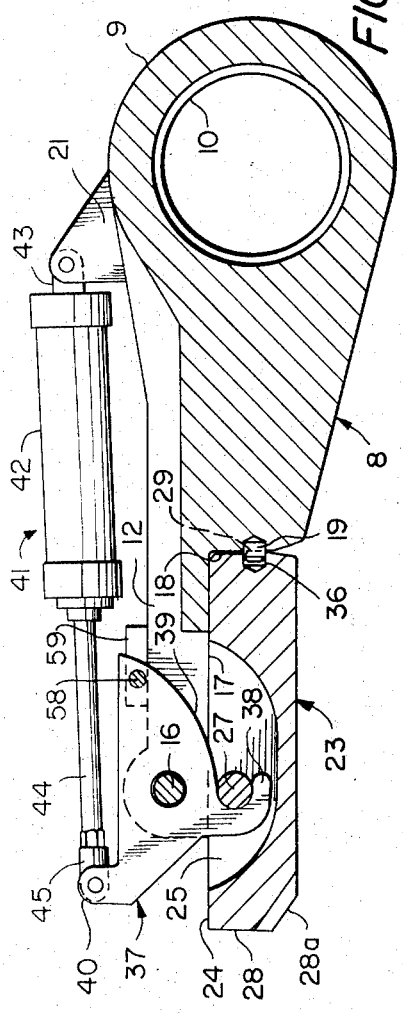
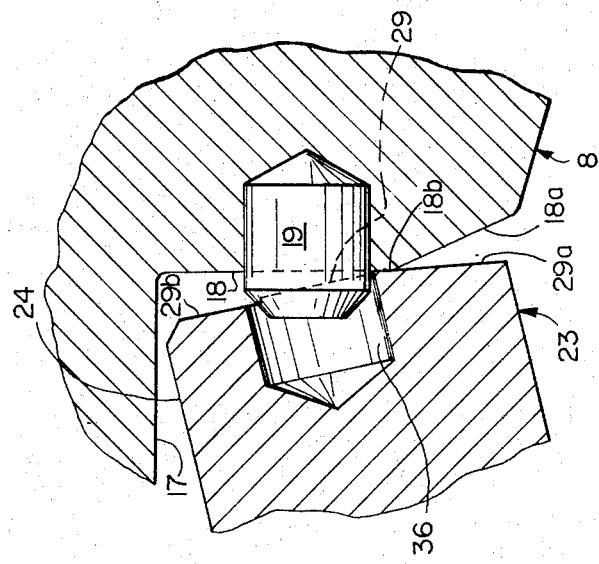
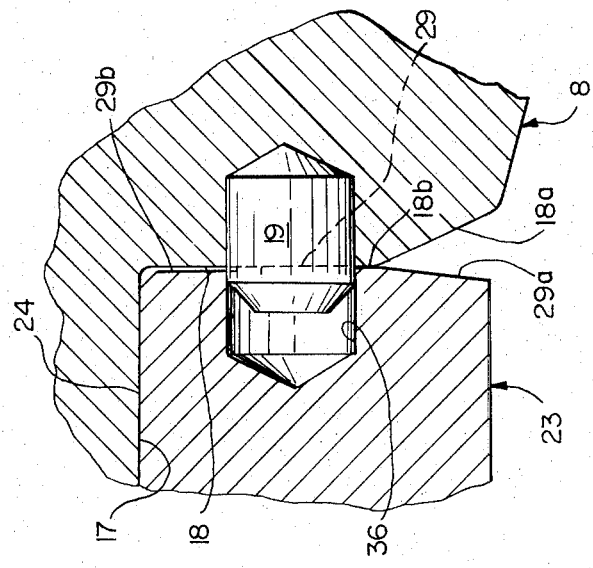

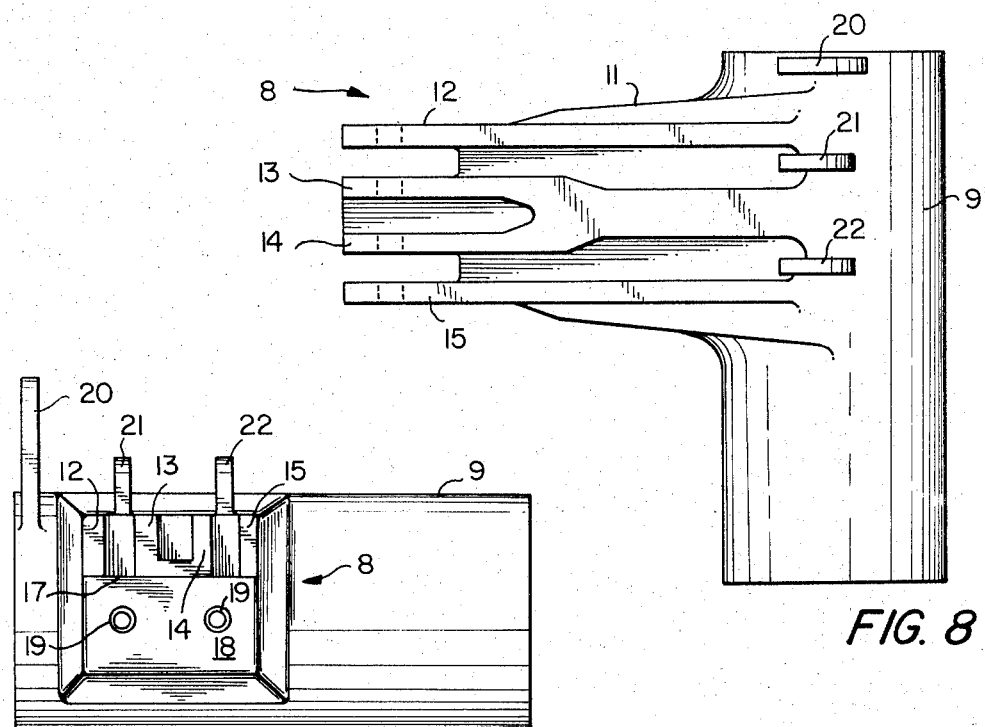
FIG. 8
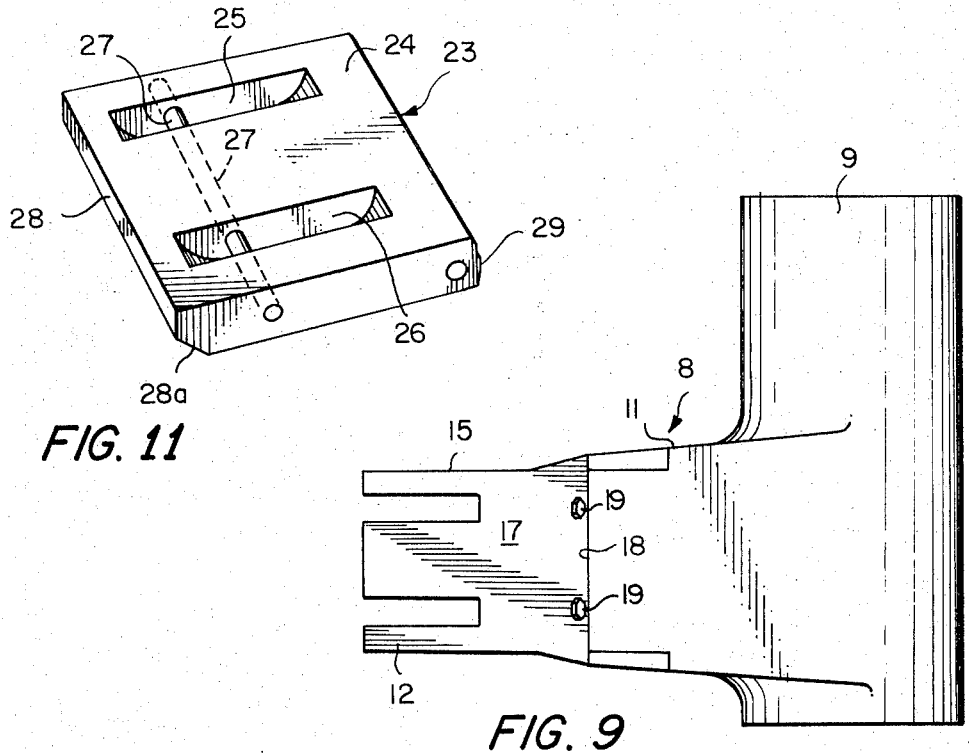
FIG. 10
FIG. 11
FIG. 9

POWER-RELEASED CHAIN STOPPER

BACKGROUND OF THE INVENTION

Because of the early use of heavy chains as anchor lines and the like on ships, the need to arrest a chain and thereby place the same under tension has long existed, and many devices, now commonly called chain stoppers, have been proposed for arresting chains. Since the forces involved in arresting an anchor chain or the like and maintaining the chain under tension are large, prior-art workers have sought to find ways to reduce the work required for releasing the chain stopper. One such approach has involved the use of a chain stopping pawl which is in the nature of a toggle, such devices being typically shown in United States Pat. Nos. 311,573, Emery; 1,226,731, Wheeler; 3,536,024, Bugaenko et al.; 3,547,066, Bugaenko et al. Though such chain stoppers are advantageous to the extent that they provide for a quicker release of the chain, or an easier release of the chain, no such device has heretofore been provided which makes it possible to release a plurality of, e.g., anchor chains by operating a single control element such as a hydraulic valve. Further, prior-art devices have generally been inherently too complex and cumbersome to allow power operation without involving undue manufacturing cost.

A general object of the invention is accordingly to provide a toggle action chain stopper which can be operated to release by a remotely controlled power device.

Another object is to devise such a chain stopper which provides for simultaneous release of a plurality of anchor chains or the like.

SUMMARY OF THE INVENTION

Considered broadly, chain stoppers according to the invention comprise an arm structure which is pivoted and arranged to be swung, as by a first power device, between an inactive position and a chain-engaging position, the arm structure including a pawl member which is mounted on the pawl structure by a loose connection, power operated means being carried by the arm structure for latching the pawl member rigidly in place on the arm structure, preparatory to engagement with the chain, and for releasing the pawl member from the chain with an essentially instantaneous toggle action.

In order that the manner in which the foregoing and other objects are achieved according to the invention can be understood in detail, one particularly advantageous embodiment thereof will be described with reference to the accompanying drawings, which form a part of the original disclosure hereof, and wherein:

FIG. 4 is a fragmentary sectional view taken generally on line 4—4, FIG. 3;

FIG. 5 is a fragmentary vertical sectional view taken generally on line 5—5, FIG. 2;

FIGS. 6 and 6A are enlarged fragmentary vertical sectional views of a portion of the structure shown in FIG. 5, FIG. 6 showing the pawl member in locked position, and FIG. 6A showing the pawl member during its toggle action release.

FIG. 7 is a side elevational view of the structure shown in FIG. 5, illustrating the parts in the positions occupied after full release of the chain stopper;

FIGS. 8–10 are top plan, bottom plan and end elevational views, respectively, of a main arm member employed in the chain stopper of FIG. 1; and FIG. 11 is a perspective view of the pawl member employed in the chain stopper.

DETAILED DESCRIPTION OF THE INVENTION

Figure 1:
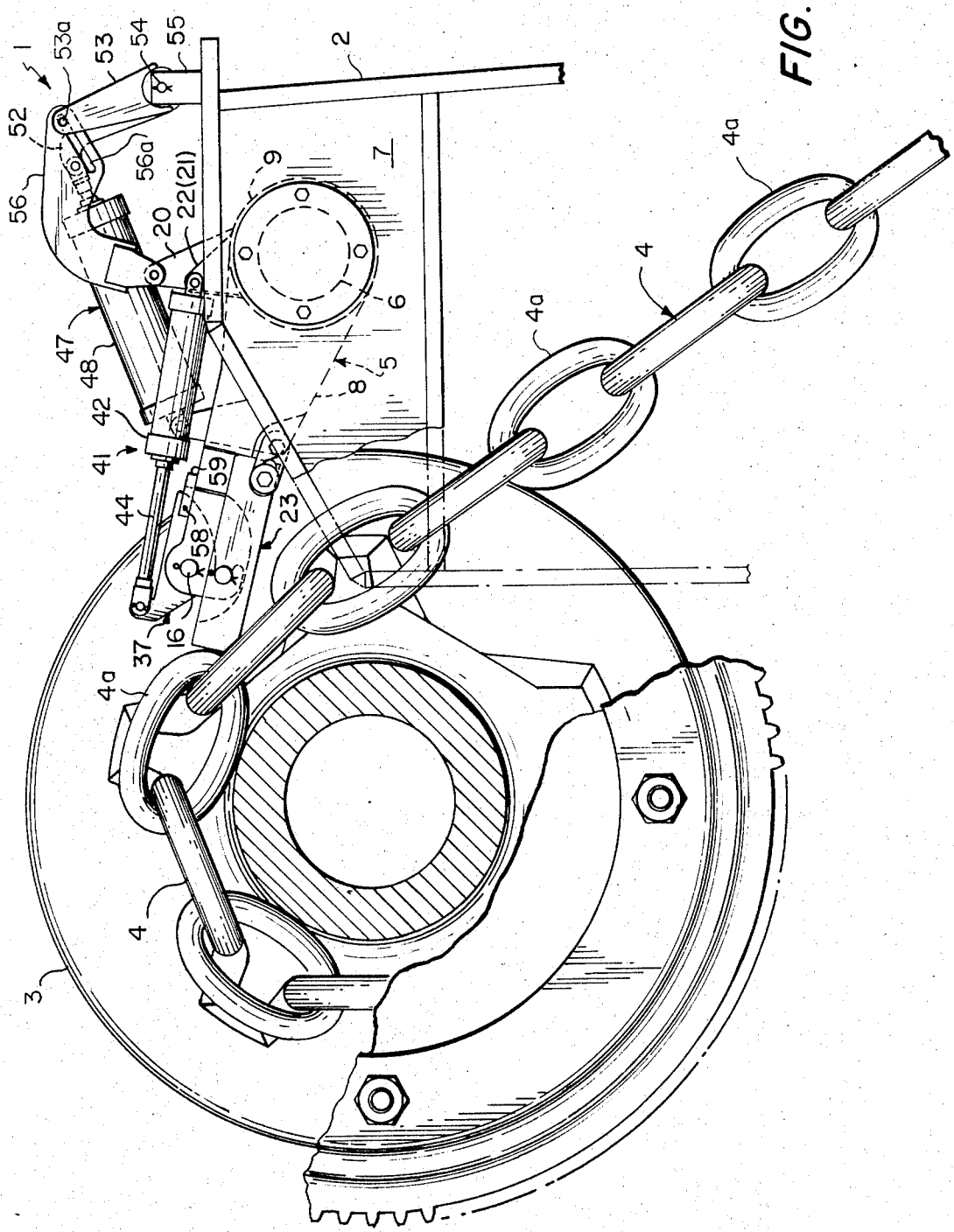
FIG. 1 is a side elevational view of a chain stopper, according to one embodiment of the invention, applied to a windlass, only a portion of the windlass being illustrated and parts thereof being broken away for clarity.
Figure 2:
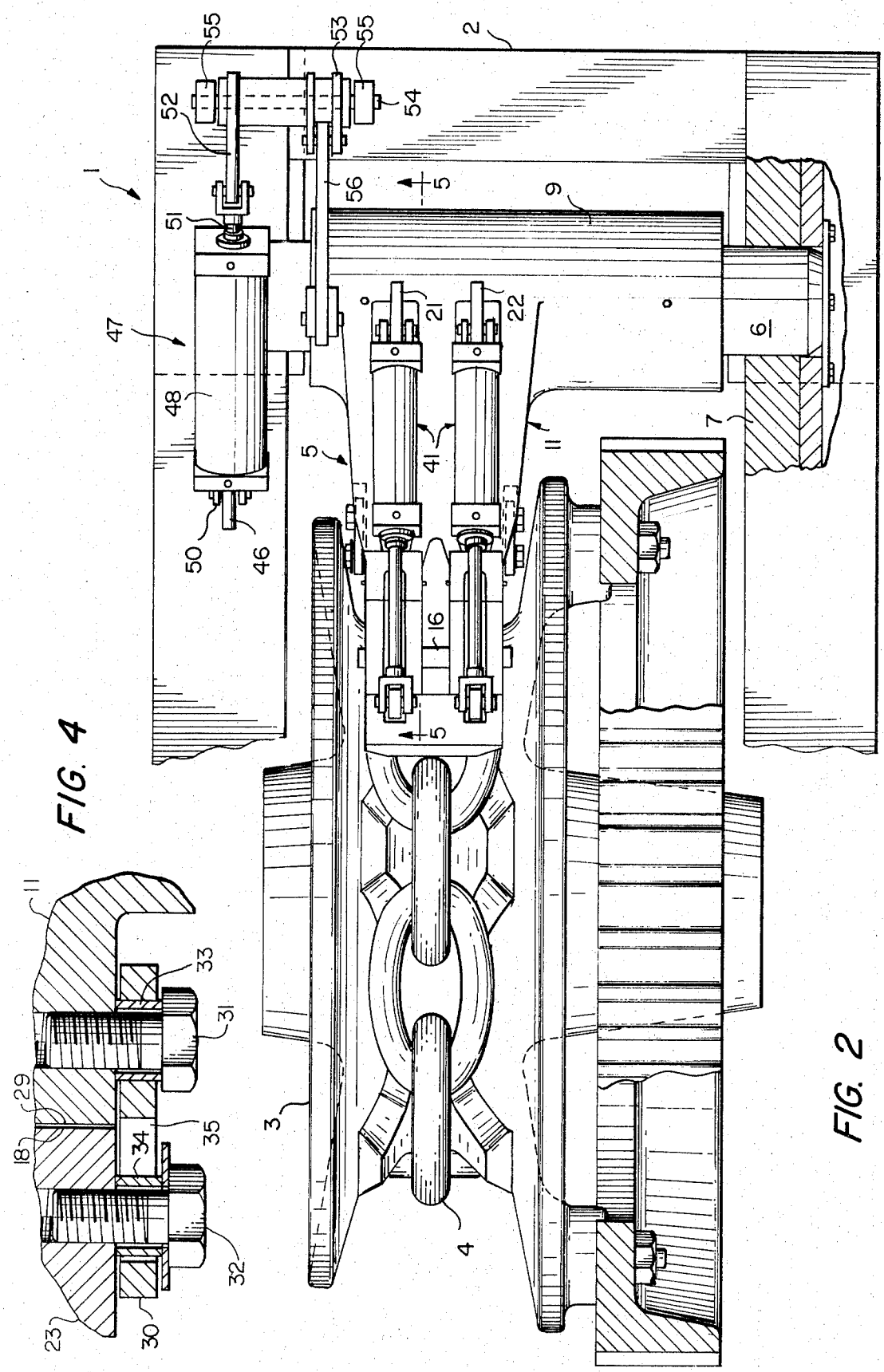
FIG. 2 is a top plan elevation of the apparatus of FIG. 1.
Figure 3:
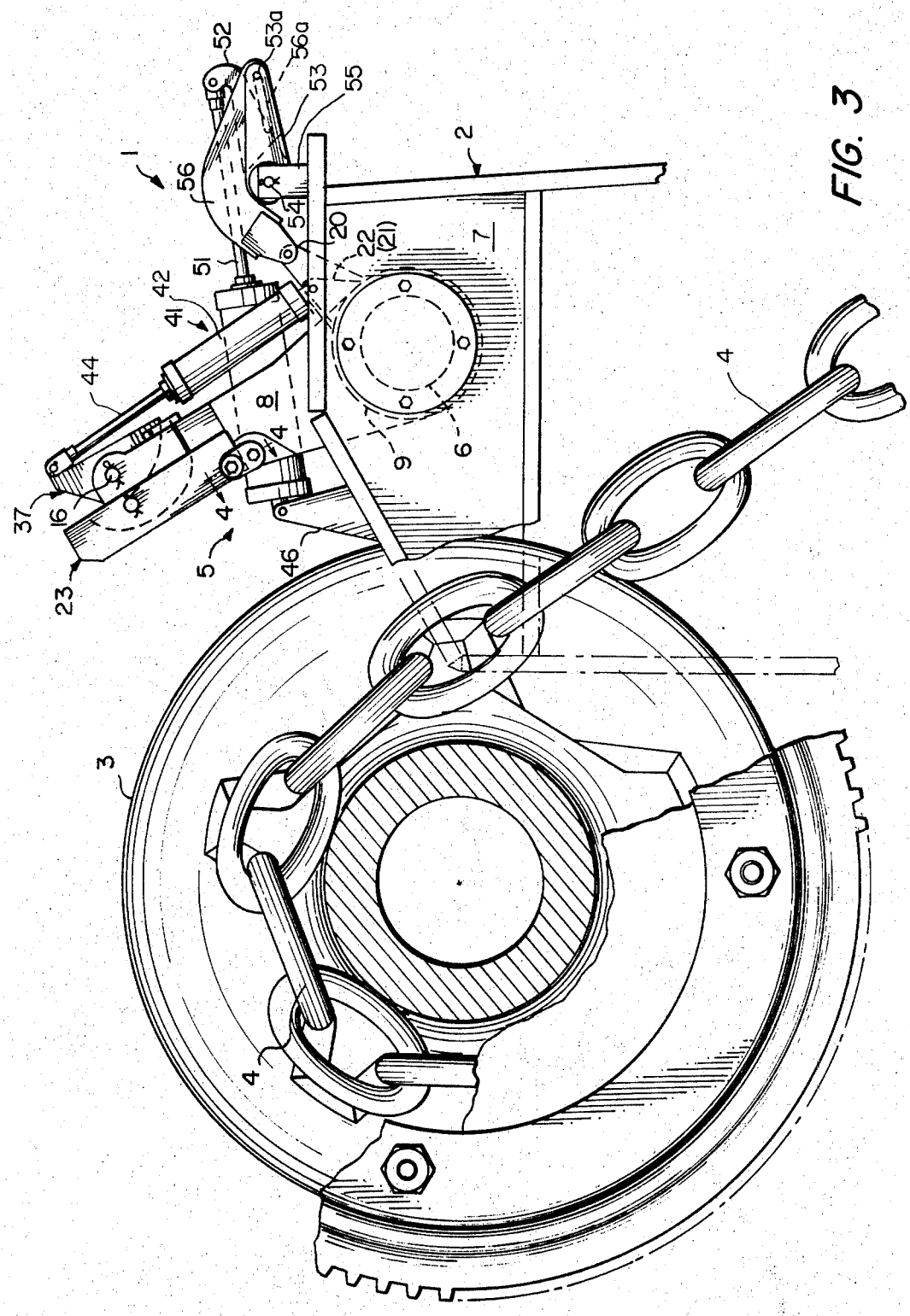
FIG. 3 is a view similar to FIG. 1 but showing the chain stopper disengaged from the chain.

Considering first FIGS. 1–3, the chain stopper 1 is mounted on a frame 2 adjacent a conventional anchor chain windlass which includes a wildcat 3 about which the chain 4 is run. Chain stopper 1 comprises an arm structure indicated generally at 5 which is rotatably carried by a fixed shaft 6 supported on side plates 7 of frame 2 so that the arm structure can be swung about the longitudinal axis of the shaft.

Arm structure 5 comprises a main arm member 8 which is integral with and projects generally radially from a hollow cylindrical hub 9, FIGS. 8–10, lined with a suitable sleeve bearing 10, FIG. 5, and embracing shaft 6. Projecting from hub 9 is a main arm portion 11 which, at its free end, is divided into parallel webs 12–15 which are provided with aligned openings to accommodate a transverse shaft 16, FIG. 5. Considering the side of arm portion 11 equipped with webs 12–15 to be the top, the tip portion of the main arm portion has a bottom face 17, FIGS. 9 and 10, which is flat and parallel to the longitudinal axis of hub 9 but significantly shorter than the overall length of member 8. Between face 17 and hub 9, arm portion 11 is thickened so that there is a transverse shoulder 18 which joins face 17 and faces away from hub 9. Two short cylindrical locking pins 19, FIGS. 5–6A, are fixed in blind bores which open through shoulder 18, pins 19 being mutually parallel and essentially radial with respect to the axis of hub 9. The exposed tips of pins 19 are tapered frusto-conically.

Integral with hub 9 are a main ear 20 and two smaller ears 21 and 22, the ears being flat, mutually parallel and lying in planes which are transverse to hub 9. Arm portion 11 is offset so as to be nearer one end of hub 9, and ear 20 is immediately adjacent that end of the hub. Ears 21 and 22 are aligned generally with the space between webs 12 and 13, and the space between webs 14 and 15, respectively.

Arm structure 5 further includes a pawl member indicated generally at 23 and formed as an integral metal block having a rectangular top face 24, FIG. 11, dimensioned to completely cover bottom face 17 of arm portion 11 when the pawl member is in place under the free end of the arm portion as seen in FIG. 5. Two parallel slots 25, 26 are cut in the pawl member, the slots opening through face 24, being of elongated rectangular plan configuration and having generally arcuate bottom walls. Located adjacent and parallel to opposite sides of the pawl member, slots 25, 26 are so disposed that, in the assembled arm structure, slot 25 is aligned with and below the space between webs 12 and 13, while slot 26 is aligned with and below the space between webs 14 and 15. Pawl member 23 is bored transversely to accommodate a fixed cylindrical pin 27, the bore being so positioned that pin 27 is at right angles to and passes through both slots 25, 26 in a location nearer to the chain-engaging tip face 28 of the pawl member than to the opposite face 29.

Pawl member 23 is attached to arm portion 11 by a loose connection comprising two flat links 30, FIG. 4, and screws 31 and 32. Screws 31, each equipped with a cylindrical sleeve 33, are engaged in aligned threaded bores in arm portion 11 and pass through circular openings in the corresponding end portions of links 30, which openings closely embrace the sleeves 33. Screws 32, equipped with cylindrical sleeves 34, pass through slots 35, which are elongated lengthwise of the links, the screws being engaged in aligned threaded bores in pawl member 23. Slots 35 are of a length substantially greater than the diameter of sleeves 34. As best seen in FIG. 3, the axis of screws 32 is adjacent the junction between the bottom face of the pawl member and end face 29.

Shoulder 18 extends at right angles to face 17 and parallel to the axis of hub 9, and joins a flat face 18a which slants away from the plane of the shoulder and toward hub 9 at an angle of, e.g., 30°. Shoulder 18 and face 18a join in a rounded corner 18b which is located slightly below pins 19.

Below bores 36, end face 29 of pawl member 23 includes a flat portion 29a which slants away from the main end face and toward tip 28 at an angle of, e.g., 6°. Above bores 36, portion 29b of end face 29 is cut back slightly, so that, when faces 17 and 24 are in engagement and pawl member 23 is forced against shoulder 18, contact between the end face 29 and shoulder 18 is limited to that area of the end face 29 between portions 29a and 29b, and thus to the area occupied generally by bores 36. Bores 36 have a diameter slightly larger than that of pins 19. Thus, with pawl member 23 having a thickness of 4 in. and pins 19 a diameter of 1.5 in., bores 36 can have a diameter of 1.51 in.

When the arm structure 5 is in its chain-stopping position, shown in FIG. 1, pawl member 23 occupies the position seen in FIG. 6, with pins 19 engaged in bores 36 and with the main portion of end face 29 engaging shoulder 18. During operation of the apparatus to release the chain, pawl member 23 pivots away from shoulder 18 in the manner illustrated by FIG. 6A, with the pawl member first rocking about the rounded edge presented by the junction between portion 29a and the main portion of end face 29, and with further pivotal movement causing portion 29a to engage and rock on the rounded corner 18b. Such pivotal movement of the pawl member causes bores 36 to swing out of engagement with pins 19, with a minimum of mechanical interference since pins 19 are short and have chamfered tips.

Slots 35, FIG. 4, allow adequate freedom of movement of pawl member 23 relative to main arm member 8 for ease of manipulation of the pawl member to the engaged position seen in FIG. 6, and for the pivotal movement illustrated by FIG. 6A, the primary purpose of links 30 being to retain the pawl member as the device is actuated to the fully released condition seen in FIG. 7.

Tip face 28 can be of any configuration suitable for engaging a link of the chain to be arrested, and can be bevelled along its bottom edge, as shown at 28a, FIGS. 5 and 11.

Shaft 16 supports two identical combined latch-and-cam members 37, FIG. 5. Each member 37 is in the form of a flat plate-like element including a hook portion 38, a convex cam edge 39, a pivot ear 40, and a hub freely embracing shaft 16. The thickness and disposition of the members 37 are such that one member is freely disposed in the space between webs 14 and 15 and can pass freely through slot 26 of the pawl member, while the other member 37 is freely disposed between webs 12 and 13 and can pass freely through slot 25. Each hook portion 38 opens toward hub 9 and is shaped and dimensioned to be operatively engaged about pin 27 in the manner seen in FIG. 5, pin 27 lying in a plane which includes shaft 16 and is at right angles to faces 17 and 24 when the device is assembled as shown in FIG. 5. Cam edge 39 extends from the notch of hook portion 38 upwardly and toward hub 9 and is of a shape such that the radial distance from the cam edge to the axis of shaft 16 increases with the distance along the cam edge from hook portion 38.

Each member 37 is operated by a different one of two bidirectional hydraulic rectilinear power devices 41, the cylinder 42 of each power device being pivotally connected to a different one of ears 21 and 22 by a clevis 43, FIG. 5, and the free end of the piston rod 44 of each power device 41 being pivotally connected to the ear 40 of a different one of the members 37 by a clevis 45. Power devices 41 are each connected to a source of hydraulic fluid under pressure (not shown) common to both power devices 41, the connection being under control of a single control valve (not shown). When more than one chain stopper 1 is employed for simultaneous operation, as when a plurality of anchor chains are to be released simultaneously, the power devices 41 of all of the chain stoppers can be connected for simultaneous operation via a single control valve. Alternatively, the power devices can be arranged for independent operation.

As will be clear from FIG. 5, operation of power devices 41 to extend piston rods 44 pivots members 37 simultaneously in a counterclockwise direction (as viewed) to engage hook portions 38 with pin 27 and urge pawl member 23 toward hub 9, so that pins 19 are engaged in bores 36 and face 29 is engaged against shoulder 18. Operation of power devices 41 in the opposite direction causes members 37 to be swung clockwise (as viewed in FIG. 5), first disengaging hook portions 38 from pin 27 and then causing cam edges 39 to ride along pin 27.

In a location between hub 9 and wildcat 3 of the windlass, frame 2 carries an upright ear 46. A main bidirectional pneumatic rectilinear power device 47 has its cylinder 48 pivoted to ear 46 by a clevis 50. The free end of piston rod 51 of power device 47 is pivotally connected to a lever 52 which is rigidly joined to a second lever 53, the two levers being rotatably carried by a shaft 54, FIG. 2, supported on frame 2 by brackets 55. Lever 53 is operatively connected to ear 20 of arm structure 5 by a link 56. Link 56 is generally L-shaped, the end of the shorter leg thereof being pivotally connected to ear 20, and the angle of the L thereof opening generally toward shaft 54. The end portion of the longer leg of the L of link 56 is provided with a straight slot 56a which is aligned with a line which, if extended, would cross the ends of the two legs of the L of the link. The connection between lever 53 and link 56 is by a pin 53a which is fixed to the end of the arm and projects through slot 56a. When arm structure 5 is in it chain-stopping position, seen in FIG. 1, pin 53a is located at one end of slot 56a, and the slot slants downwardly from the pin toward the chain. Accordingly, the chain can be drawn in, by counterclockwise rotation of wildcat 3, because slot 56a allows arm structure 5 to ratchet relative to the chain, pawl member 23 riding up as each alternate link 4a arrives and descending again by gravity to chain-stopping position after each link 4a passes. When power device 47 is operated to extend its piston rod 51, lever 53 swings clockwise (as viewed in FIG. 1) and, since pin 53a is engaged in the end of slot 56a, arm structure 5 is swung clockwise to the inactive position shown in FIG. 3. With the parts in the relative positions shown in FIG. 3, slot 56a is approximately radial with respect to shaft 54, and arm structure 5 has been stopped short of the vertical, so that the weight of the arm structure still urges the arm structure back toward it chain-stopping position. Accordingly, when power device 47 is operated to retract its piston rod 51, the resulting counterclockwise (as viewed) movement of lever 53 causes link 56 to move toward wildcat 3 at a controlled rate, allowing arm structure 5 to return by gravity to the chain-stopping position seen in FIG. 1.

Power device 47 can be connected to a source of compressed air (not shown) via a control valve (not shown), and that control valve can be operated in conjunction with the control valve for the hydraulic power devices 41 so that, when arm structure 5 is in its chain stopping position (FIGS. 1 and 2) and it becomes necessary to quickly release the chain, without first taking a strain thereon by operation of the windlass, power devices 41 are operated to retract their piston rods simultaneously with operation of power device 47 to extend its piston rod.

As soon as power devices 41 begin to retract their piston rods 44, so that hook portions 38 are disengaged from pin 27, cam edges 39 begin to coact with the pin 27, applying a force which acts between arm member 8 and pawl member 23. At the start of retraction of piston rods 44, pawl member 23 occupies the position shown in FIGS. 5 and 6. As arm structure 5 begins to swing upwardly and cam edges 39 begin to ride over pin 27, the arm member 8 and the pawl member move away from each other in generally pivotal fashion, with the start of this movement being about the juncture between end face 29 and portion 29a, as will be clear from FIG. 6A. At the start of such relative movement between members 8 and 23, a link 4a of the chain still engages tip face 28 of the pawl member with great force, so resisting the action of power device 47 but tending to promote the relative pivotal movement between members 8 and 23. When such relative pivotal movement proceeds beyond that point at which pins 19 are no longer engaged in bores 36, arm structure 5 exhibits a toggle release action, with tip face 28 of the pawl member lagging behind, because of its engagement with the chain, as the arm structure swings upwardly away from the chain. The effect of that action is a sudden shortening of the radial distance between the axis of hub 9 and tip face 28, thus suddenly relieving the force with which the pawl member is engaged with the chain and allowing positive movement of the arm structure to the inactive position shown in FIG. 3.

Once pawl member 23 has disengaged from the chain, and as the arm structure swings toward its inactive position, the pawl member drops and is retained on arm member 8 by the loose connection afforded by links 30 and screws 31, 32, as seen in FIG. 7. Preparatory to next use of the chain stopper, pawl member 23 is returned by hand to the position shown in FIGS. 5 and 6, and power devices 41 are operated to extend piston rods 44 and thereby pivot members 37 counterclockwise (as viewed) to re-engage hook portions 38 with pin 27 and thus lock the pawl member in place. In this connection, it is to be recognized that, when the device is used in conjunction with, e.g., anchor chain, the pawl member 23 is necessarily of substantial size and has a correspondingly large weight, typically in excess of 100 lbs. The loose connection afforded by links 30 and screws 31, 32 serves as a convenient means for retaining the pawl member in a position from which it can be reset with relative ease. And, once the pawl member has been returned to the reset position shown in FIGS. 5 and 6, the combination of hook portions 38, coacting with pin 27, and pins 19, coacting with bores 36, serves to hold the pawl member securely in place on arm member 8, with faces 17 and 24 in engagement, and with end face 29 engaging shoulder 18.

So that power devices 41 need not be relied upon to hold members 37 in their latched positions, replaceable shear pins 58, FIG. 5, are provided, the shear pins extending through bores in members 37 at the ends of cam edges 39 and having their respective ends carried by the legs of U-shaped pressure pads 59 which bear upon the upper edges of the respective webs 12–15.

It will be understood that, under normal circumstances, the chain stopper is released by first operating the windlass to take a strain on the chain and then operating power device 47 to swing arm structure 5, now essentially free of the chain because the strain thereon has been assumed by the windlass, to its inactive position. Under normal circumstances, power devices 41 are not operated, and the pawl member simply remains in the position seen in FIGS. 5 and 6.

While chain stoppers according to the invention have broad utility, they are particularly advantageous when used in connection with anchor chains for offshore well drilling vessels and the like, where selective quick release of one or more of a plurality of anchor chains may be desirable. In the case, for example, of a generally rectangular drilling vessel equipped with four anchor chains, with the chains extending each from a different corner of the vessel, and with one chain stopper according to the invention being provided for each anchor chain, the need for quickly moving the vessel off the well can be satisfied simply by simultaneously releasing the chain stoppers for two of the anchor chains which are at the same side, or the same end, of the vessel, leaving the other two anchor chains taut, with the result that the two chains which remain taut will pull the vessel away from its original, anchored position. With proper control valves provided, any combination of a plurality of chains can be released simultaneously, or any one of the chains can be released independently of the others.

What is claimed is:

1. In a chain stopper, the combination of
    a support;
    an arm structure mounted on said support for movement between a chain-engaging position and an inactive position, said arm structure comprising a main arm member having an end portion which is adjacent the chain when the arm structure is in its chain-engaging position, and a pawl member releasably carried by said end of said main arm member and having a chain-engaging end;

a first power device operatively connected to said arm structure for moving the arm structure from its chain-engaging position to its inactive position;

a latch device mounted on said arm structure for movement between a first position, in which said latch device latches said pawl member to said main arm member, and a second position, in which said latch device allows said pawl member and main arm member to move relative to each other; and a second power device operatively connected to said latch device to move said latch device from its first position to its second position as said first power device operates to move said arm structure toward its inactive position.

2. The combination defined in claim 1, wherein said second power device is carried by said arm structure.

3. The combination defined in claim 2, wherein said latch member is mounted for pivotal movement about an axis transverse to said arm structure; and said second power device is a pressure fluid-operated rectilinear power device extending lengthwise of said arm structure.

4. The combination defined in claim 1, wherein said arm structure is mounted for pivotal movement;

said main arm member has a transverse shoulder which faces away from the axis of pivotal movement of the arm structure;

said pawl member has an end face which is opposite said chain-engaging end and is disposed in engagement with said shoulder when the pawl member is engaged with the chain, pivotal movement of said arm structure toward its inactive position, after movement of said latch member to its second position, causing said pawl member and said main arm member to swing away from each other, with said end face of said pawl member and said shoulder of said main arm member coacting to provide a fulcrum for such swinging movement, whereby the effective distance between the axis of pivotal movement of said arm structure and said chain-engaging end of said pawl member is abruptly shortened to effect a toggle action release of the chain stopper.

5. The combination defined in claim 4, and further comprising means providing a loose connection between the end of said pawl member opposite said chain-engaging end and said main arm member, whereby said pawl member is retained by said arm structure after release of the chain stopper.

6. The combination defined in claim 4 and further comprising at least one positioning pin secured to and projecting from one of said main arm member and said pawl member, said at least one pin projecting lengthwise of said arm structure, the other of said main arm member and said pawl member being provided with at least one positioning bore disposed to loosely accommodate said at least one pin when said pawl member is latched to said main arm member.

7. The combination defined in claim 6, wherein said pawl member is provided with a transverse pin spaced from said end face; and said latch device includes a latch member pivotally mounted on said main arm member, said latch member having a hook portion disposed to engage said transverse pin from the side thereof opposite said end face, engagement of said latch member with said transverse pin urging said end face of said pawl member against said shoulder of said main arm member.

8. The combination defined in claim 7, wherein said pawl member has a slot extending lengthwise of said arm structure and dimensioned to pass said latch member, and said transverse pin extends across said slot.

9. The combination defined in claim 7, wherein the free end of said main arm member includes two portions which extend lengthwise of the arm structure and are spaced apart transversely, said latch member being located between said two portions and mounted thereon by a shaft extending therebetween.

10. The combination defined in claim 7, wherein said latch member has a convex cam edge disposed to ride over said transverse pin and urge said pawl member and said main arm member apart as said latch member is moved from said first position toward said second position.

11. The combination defined in claim 7, and further comprising shearable means for retaining said latch member in said first position.

12. The combination defined in claim 1, and further comprising motion transfer means connecting said first power device to said arm structure and including lost motion means arranged to allow said arm structure to ratchet when the chain is drawn in through the chain stopper.

* * * * *